United States Patent Office 3,595,812
Patented July 27, 1971

3,595,812
CATIONIC POLYMERIZATION OF CYCLIC ETHERS
Jeffrey John Kendall Boulton, Lymm, England, assignor to B.P. Chemicals Limited, London, England
No Drawing. Filed Aug. 11, 1966, Ser. No. 571,707
Claims priority, application Great Britain, Sept. 7, 1965, 38,126/65; Jan. 13, 1966, 1,586/66; Feb. 1, 1966, 4,352/66
Int. Cl. C08g 1/04, 23/04; C08b 5/04
U.S. Cl. 260—2                                6 Claims

ABSTRACT OF THE DISCLOSURE

Carbonium and oxonium hexafluoro phosphate compounds are used as catalysts in the polymerization of monomeric materials such as cyclic ethers, formals, acetals, N-arylimino compounds, alkyl vinyl ethers, aromatic vinyl compounds and alkenes.

---

The present invention relates to cationic polymerisation processes and to catalysts for such polymerisation processes.

Friedel-Crafts catalysts, in the presence of suitable co-catalysts, and protonic acids have been widely used to initiate cationic polymerisations. More recently the use of carbonium and oxonium salts has been described e.g. triethyloxonium tetrafluoroborate ($Et_3O^+BF_4^-$), triethyloxonium tetrachloroferrate ($Et_3O^+FeCl_4^-$), triethyloxonium tetrachloroaluminate ($Et_3O^+AlCl_4^-$), triphenylmethyl hexachloroantimonate ($Ph_3C^+SbCl_6^-$) and triethyloxonium hexachloroantimonate ($Et_3O^+SbCl_6^-$). The use of these catalysts in polymerisation processes often gives rise to variable results and in particular it is difficult to devise a process which reproduceably yields high molecular weight products.

An object of the present invention is to provide a new process for the production of increased molecular weight polymers and copolymers by a cationic polymerisation process.

Accordingly, the present invention is a cationic polymerisation process carried out in the presence of a carbonium or oxonium salt, which comprises adding to a monomeric material capable of undergoing such polymerisation a catalyst having the general formula $$Q^+[PF_6]^-$$

wherein $Q^+$ represents a triarylcarbonium or trialkyloxonium ion, and adjusting the temperature of the reaction mixture until polymerisation takes place.

The triarylcarbonium ion and the trialkyloxonium ion may respectively be represented thus

wherein each R represents the same or different aryl group which may be substituted or unsubstituted and each $R^1$ represents the same or different alkyl groups which may be substituted or unsubstituted. When substituted these groups should only bear those substituents which do not seriously affect the polymerisation process at the particular temperature employed or the shelf stability of the carbonium or oxonium salt. Examples of such substituents, the choice of which depends on the polymerisation conditions, are alkyl, aryl, halogen, alkoxy, aryloxy, alkylthio, arylthio and nitro substituents. Electrondonating substituents such as hydroxy, amino and mercapto groups should preferably not be present.

The alkyl groups of the oxonium ion are preferably lower alkyl groups containing up to six carbon atoms, e.g. methyl, ethyl, propyl, butyl, amyl and hexyl groups.

The aryl groups of the carbonium ion may be for example phenyl or naphthyl, but are preferably phenyl.

The polymerisation catalysts used in the process of the present invention may be readily prepared by the techniques of organic and inorganic chemistry. The trialkyloxonium salts may be prepared for example according to the directions by H. Meerwein, V. Hederich and K. Wanderlich (Archiv. der Pharmazie 1958, 291/63, 552) and the triarylcarbonium salts may be prepared for example according to the directions of D. W. A. Sharp and N. Sheppard (J.C.S. 1957, 674). Taking a particular example a catalyst having a formula $Et_3O^+PF_6^-$ can be prepared by reacting the silver hexafluorophosphate with ethyl bromide in excess diethyl ether; or a catalyt having a formula $(C_6H_5)_3C^+PF_6^-$ can be prepared by reacting silver hexafluorophosphate and triphenylmethyl chloride in nitromethane solution. In an alternative method $(C_6H_5)_3C^+PF_6^-$ can be prepared by reacting triphenylmethyl fluoride with phosphorus pentafluoride under anhydrous conditions. In a further alternative method

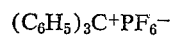

can be prepared by a modification of the method of H. J. Dauben, L. R. Honnen and K. M. Harmar (J. Org. Chem. 1960), 25, 1442, for example by the addition of excess hexafluorophosphoric acid to a solution of triphenylcarbinol in propionic anhydride.

The polymerisation catalysts used in the process of the present invention are generally relatively stable crystalline solids at room temperature. They should be stored in the absence of water and may conveniently be kept in a suitable solvent, e.g. nitromethane. If necessary the catalysts may be stored at temperatures lower than room temperature.

The proportion of catalyst required may conveniently lie in practice within the range of 0.01% to 0.5% by weight of the monomer or monomers present, although in principle the catalyst proportion can lie well outside this range. It has been found that the smaller the quantity of catalyst present the higher the molecular weight of the resulting polymer and accordingly to some extent the molecular weight of the polymer can be controlled by controlling the amount of catalyst present.

The monomeric material used in the process of the present invention may be a single monomer or a mixture of one or more monomers which are capable of undergoing polymerisation or copolymerisation in the presence of carbonium or oxonium salts as catalysts. Examples of suitable monomers which can be used either alone or in combination in the process of the invention are cyclic ethers for example tetrahydrofuran, oxetanes, e.g. 2-bis-(chloromethyl)-oxetane, trioxane, 1,3-dioxolane, formals, acetals and N-arylimino compounds for example ethylene-N-phenyliminocarbonate

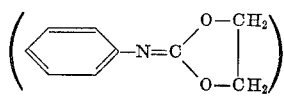

and N-phenyliminotetrahydrofuran; alkyl vinyl ethers for example methyl, ethyl, isobutyl, tertiarybutyl and cyclohexyl vinyl ether; aromatic vinyl compounds for example styrene and N-vinyl-carbazole; and alkenes such as indene. The preferred class of monomers are the cyclic ethers which have 4- or 5-membered oxygen heterocycles containing 1 or 2 oxygen hetero atoms or have a 6-membered oxygen heterocycle containing 3 oxygen hetero atoms. Particularly preferred are the cyclic ethers which have 5-membered heterocycles containing 1 or 2 oxygen hetero atoms.

As is well known in the art, monomers which do not homopolymerise under a given set of conditions may, nevertheless, copolymerise with certain other monomers under similar conditions. The process of the present invention is intended to cover the copolymerisation of any monomer which will homopolymerise in the presence of carbonium or oxonium salt catalysts with any other such monomer or any other monomer which will copolymerise in the presence of carbonium or oxonium salt catalysts.

The monomeric material may be polymerised in bulk, in solution or in dispersion according to established practice. Monomers which are in the liquid phase at the polymerisation temperature are conveniently polymerised in bulk, whereas monomers which are in the solid phase are conveniently polymerised in solution. In the latter circumstances solvents should be chosen which do not seriously hinder the polymerisation process. Examples of such solvents include nitromethane, nitroethane, acetonitrile and methylene chloride.

The process of the present invention can be carried out at ambient or lower temperatures, provided that either the monomeric material is in the liquid phase or that it is soluble in a convenient solvent. Higher temperatures may also be employed subject to the stability of the catalyst and the nature of the monomeric material. The molecular weight is generally found to decrease with increasing polymerisation temperature. Generally speaking polymerisation temperatures in the range $-70°$ to $+100°$ C. can be employed; temperatures in the range $0°$ to $30°$ C. are usually preferred.

To obtain the highest monomer conversion and molecular weights the polymerisation reactions according to the present invention are preferably carried out under substantially anhydrous conditions and in the absence of other substances which act as chain transfer or terminating agents, e.g. water, alcohols and amines.

Polymers and copolymers produced according to the process of the present invention can readily be recovered from the reaction mixture by known techniques. For example, in the preparation of poly(1,3-dioxolane), the product can be dissolved in a suitable solvent, for instance, boiling benzene containing a few drops of triethylamine. The polymer can then be recovered from the solution by the addition of a miscible liquid in which it is not soluble, for example, cyclohexane.

An advantage of the process of the present invention is that the catalysts can be prepared as pure crystalline solids which do not require the addition of co-catalysts e.g. water to give active polymerisation initiators. These catalysts can be easily weighed and manipulated under reasonably anhydrous conditions. The process leads to products having higher molecular weights than can be obtained by known cationic polymerisation processes using carbonium or oxonium salts as catalysts.

Since the process of the present invention is generally free from chain transfer and terminating agents, with certain monomers, "living" cationic polymers can be obtained therefrom and thus the process lends itself to the production of block copolymers.

The polymers and copolymers of the present invention find particular use in moulding and calendering compositions for rigid and elastomeric products, as adhesives and as coatings.

The following examples illustrate the processes and catalysts of the present invention. In these examples, unless otherwise stated the inherent viscosity was measured in chloroform at 25° C.

EXAMPLE I

Preparation of $Et_3O^+PF_6^-$ 5.9 g. of silver hexafluorophosphate was suspended in 50 ml. of dry ethylene dichloride and 10 ml. dry diethyl ether was added to the suspension with stirring. The mixture was cooled and maintained at 30° C. while 10 ml. of ethyl bromide was added, and was then allowed to warm to room temperature. After standing for 18 hours the product was filtered to remove silver bromide and after addition of dry charcoal and kieselguhr it was filtered again. On cooling to 0° C. triethyloxonium hexafluorophosphate crystallised from the yellow solution and was isolated by filtration. After drying in vacuo the yield was 0.9 g. and the melting point 137–137.5° C.

Polymerisation of tetrahydrofuran

A quantity (see Table A) of the crystalline triethyloxonium hexafluorophosphate as prepared above, was weighed into a dry glass tube (30 ml. capacity) under anhydrous conditions. After evacuation of the tube there were also charged 10 ml. of pure tetrahydrofuran (which had previously been stored in an evacuated separate vessel). The tube was sealed in vacuo, and was warmed to ambient temperature and maintained at 25° C. for 48 hours.

The tube was opened, the contents were dissolved in 200 ml. of chloroform containing 0.5 ml. triethylamine and the polymer was precipitated by addition of this solution to a mixture of 1500 ml. of ethanol and 500 ml. of water. The liquid was decanted off the product which was then dried in vacuo at ambient temperature. The results of four runs at different catalyst concentrations are shown in Table A below.

TABLE A

| Run No. | Catalyst | | Product | |
|---|---|---|---|---|
| | Wt. (g.) | Concn.[1] | Inherent viscosity | Yield, percent |
| I(a) | 0.0136 | 4.46×10⁻⁴ | 4.69 | 74.4 |
| I(b) | 0.0136 | 4.46×10⁻⁴ | 3.90 | 67.6 |
| I(c) | 0.0017 | 5.57×10⁻⁵ | 8.29 | 21.4 |
| I(d) | 0.0017 | 5.57×10⁻⁵ | 12.0 | 64.3 |

[1] Moles/mole of monomer.

EXAMPLE II

A number of polymerisation runs were carried out using trityl hexafluorophosphate as catalyst and tetrahydrofuran as monomer in a sealed tube at 25° C. The results are given in Table B below, the method employed being essentially the same as that of Example I.

TABLE B

| Run No. | Catalyst concn. (moles/litre) | Polymerisation time (hours) | Inherent viscosity | Yield, percent |
|---|---|---|---|---|
| II(a) | 0.00548 | 43 | 17.05 | 70 |
| II(b) | 0.00548 | 44 | 8.02 | 76.4 |
| II(c) | 0.01096 | 48 | 4.59 | |
| II(d) | 0.00274 | 90 | 8.2 | |
| II(e) | 0.00137 | 86 | 11.62 | 76.1 |

EXAMPLE III

Polymerisation of 1,3-dioxolane 1,3-dioxolane monomer was prepared according to the method of Astle et al. (Ind. Eng. Chem. 1964, 46, 787) by reacting ethylene glycol and paraformaldehyde in the presence of a cationic exchange resin, e.g. "Amberlite" (IR-120H). Calcium hydride and copper powder were added to the 1,3-dioxolane so produced and it was distilled in an atmosphere of nitrogen, the fraction boiling at 75° C., 760 mm. Hg being collected. The monomer was stored in vacuo in a vessel containing lithium aluminium hydride.

A quantity (see Table C) of trityl hexafluorophosphate was weighed into a dry glass tube (30 ml. capacity) under anhydrous conditions. After evacuation there were charged also 8.6 ml. of the 1,3-dioxolane. The vessel was sealed in vacuo. The catalyst dissolved rapidly and exothermic polymerisation set in almost immediately. On maintaining the mixture at 25° C. brown discolouration developed after 15 minutes. After 48 hours at 25° C. the polymerisation was terminated by opening the tube and dissolving the product in 100 ml. of chloroform containing 0.5 ml. triethylamine. The polymer was precipitated from the colourless solution by adding it to 800 ml. of n-heptane. The polymer was filtered and dried in vacuo at ambient temperature.

The results of several polymerisations are summarised in Table C.

TABLE C

| Run No. | Catalyst Wt. (g.) | Catalyst Concn.[1] | Product Inherent viscosity | Product Yield, percent |
|---|---|---|---|---|
| IV(a) | 0.0213 | 4.46×10⁻⁴ | 0.713 | 88.8 |
| IV(b) | 0.0213 | 4.46×10⁻⁴ | 1.019 | 87.7 |
| IV(c) | 0.0027 | 5.57×10⁻⁵ | 3.835 | 97.0 |
| IV(d) | 0.0027 | 5.57×10⁻⁵ | 6.132 | 93.2 |

[1] Moles/mole of monomer.

EXAMPLE IV

Polymerisation of 1,3-dioxolane

A quantity (see Table D) of triethyloxonium hexafluorophosphate was weighed into a glass tube which was then charged with 8.6 ml. of dry 1,3-dioxolane. The polymerisation was allowed to proceed at 25° C. for 48 hours, when the product was dissolved in 100 ml. of chloroform containing 0.5 ml. of triethylamine and poly-1,3-dioxolane was precipitated from this solution by the addition of 800 ml. of n-heptane. The polymer was dried in vacuo at ambient temperature. The results of four runs are given in Table D below.

TABLE D

| Run No. | Catalyst Wt. (g.) | Catalyst Concn.[1] | Product Inherent viscosity | Product Yield, percent |
|---|---|---|---|---|
| V(a) | 0.0136 | 4.46×10⁻⁴ | 0.75 | 89.9 |
| V(b) | 0.0136 | 4.46×10⁻⁴ | 0.945 | 87.7 |
| V(c) | 0.0017 | 5.57×10⁻⁵ | 4.581 | 94.3 |
| V(d) | 0.0017 | 5.57×10⁻⁵ | 3.087 | 99.8 |

[1] Moles catalyst/moles of monomer.

EXAMPLE V

Polymerisation of 1,3-dioxolane

A solution was prepared of 1.064 g. of triphenylmethyl hexafluorophosphate in 50 ml. of pure dry nitromethane 0.5 ml. of the catalyst solution ($1.7 \times 10^{-5}$ moles catalyst/mole monomer) was added to a solution of dry 1,3-dioxolane (10 ml.) in purified benzene (5 ml.). The product was dissolved in chloroform (100 ml.) containing triethylamine (0.5 ml.) and the polymer was precipitated by adding this solution to 800 ml. n-heptane. The results of two runs are given in Table E below.

TABLE E

| Run No. | Polymerisation Temp., (° C.) | Polymerisation Time (hours) | Product Inherent viscosity | Product Yield, percent |
|---|---|---|---|---|
| VI(a) | 20 | 96 | 0.982 | 67 |
| VI(b) | 40 | 120 | 1.076 | 39 |

EXAMPLE VI

Comparative experiments for tetrahydrofuran and 1,3-dioxolane polymers

Cationic polymerisation catalysts of the prior art, namely triphenylmethyl hexachloroantimonate $$(\text{phenyl})_3\text{C}^+\text{SbCl}_6^-$$

and triethyloxonium hexachloroantimonate $$(\text{ethyl})_3\text{O}^+\text{SbCl}_6^-$$

were compared with catalysts used in the process of the present invention in polymerisation runs with tetrahydrofuran and 1,3-dioxolane. Polymerisation was carried out at 25° C. for 48 hours in all cases. The results are given in Table F below.

TABLE F

| Catalyst | Moles of catalyst/ mole of monomer | Yield, percent | Inherent viscosity |
|---|---|---|---|
| With tetrahydrofuran as monomer: | | | |
| φ₃CPF₆ | 4.457×10⁻⁴ | 71.0 | 7.175 |
| φ₃CSbCl₆* | 4.457×10⁻⁴ | 38.3 | 3.246 |
| (Et)₃OPF₆ | 4.457×10⁻⁴ | 74.4 | 4.688 |
| (Et)₃OSbCl₆* | 4.457×10⁻⁴ | 63.1 | 2.335 |
| With 1,3-dioxolan as monomer: | | | |
| φ₃CPF₆ | 5.57×10⁻⁵ | 97.0 | 3.835 |
| φ₃CSbCl₆* | 5.57×10⁻⁵ | 52.6 | 1.861 |
| Et₃OPF₆ | 5.57×10⁻⁵ | 94.3 | 4.581 |
| Et₃OSbCl₆* | 5.57×10⁻⁵ | 68.0 | 1.858 |

The catalysts of the prior art are those marked with an asterisk. It is to be noted from these comparative results that the catalysts used in the process of the present invention give superior polymers to those of the prior art in that they give greater inherent viscosity (which is a measure of molecular weight) of the resulting polymers and also give rise to better yields of polymer.

EXAMPLE VII

Polymerisation of ethylene-N-phenyliminocarbonate

To 5 g. of ethylene-N-phenyliminocarbonate in 25 ml. of dry benzene in a glass reaction tube was added $1.064 \times 10^{-2}$ g. triphenylmethyl hexafluorophosphate. The tube was sealed under high vacuum and maintained at 20° C. for about 18 hours. 3.95 g. of polymer was isolated (yield 79% on monomer) with a melting point of 190–195° C. and an intrinsic viscosity (in chloroform at 30° C.) of 1.028. The polymer was molded at 200–210° C. to give a clear transparent disc.

EXAMPLE VIII

Polymerisation of ethylene-N-phenyliminocarbonate

A polymerisation was carried out in a similar manner to that described in Example VII, employing 5 grams of ethylene-N-phenyliminocarbonate, 25 millilitres of benzene and $0.2120 \times 10^{-2}$ grams of triphenylmethyl hexafluorophosphate. After polymerising for about 64 hours at 20° C., 0.8 gram of polymer was isolated which had a melting point of 180–190° C. and an intrinsic viscosity (in chloroform at 30° C.) of 1.235.

EXAMPLE IX

Polymerisation of N-vinylcarbazole

Vinyl carbazole (5.92 g.), triphenylmethyl hexafluorophosphate (0.0054 g.) and benzene (5 ml.) were charged to a tube under anaerobic conditions and polymerised at 25° C. for 48 hours. The catalyst was almost insoluble but polymerisation was evident after 5 minutes. The polymerised mixture was solid after 48 hours. It was dissolved in chloroform and precipitated by light petroleum (40°–60°). Yield: 4.5 g. Inherent viscosity: 0.395.

A similar polymerisation was carried out using triethyloxonium hexafluorophosphate as catalyst and 5.1 g. (86%) yield of N-vinylcarbazole polymer was obtained. Inherent viscosity: 0.513.

EXAMPLE X

Polymerisation of isobutyl vinyl ether

Isobutyl vinyl ether (6.10 g.) and triethyloxonium hexafluorophosphate (0.0068 g.) were charged to a tube under anaerobic conditions and polymerised at 25° C. for 48 hours. 3.5 g. of polymeric isobutyl vinyl ether having an inherent viscosity of 2.944 was obtained.

EXAMPLE XI

Copolymerisation with tetrahydrofuran

Using triphenylmethyl $PF_6$(A) and triethyloxonium $PF_6$(B) as catalyst tetrahydrofuran (THF) was copolymerised with the following monomers:
(i) Ethylene-N-phenyliminocarbonate
(ii) N-vinylcarbazole
(iii) 1,3-dioxolane.
The results shown in Table G were obtained.

TABLE G

| Run No. | Moles of THF | Comonomer | Moles | Catalyst | Moles | Polymerisation Time (hrs.) | Temp. (° C.) | Yield, percent | Inherent viscosity |
|---|---|---|---|---|---|---|---|---|---|
| XII(a) | 0.127 | (i) | 0.00128 | A | 5.7×10⁻⁵ | 24 | 25 | 71 | 8.314 |
| XII(b) | 0.117 | (i) | 0.00015 | B | 5.48×10⁻⁵ | 48 | 25 | 67.8 | |
| XII(c) | 0.122 | (ii) | 0.00123 | B | 5.48×10⁻⁵ | 48 | 25 | 59.75 | 3.988 |
| XII(d) | 0.0017 | (iii) | 0.0610 | B | 5.48×10⁻⁵ | 64 | 25 | 57.8 | |

I claim:
1. A cationic polymerization or copolymerization process carried out in the presence of a carbonium salt which comprises adding to a monomeric cyclic ether which has 4- or 5-membered oxygen heterocycles containing 1 or 2 oxygen atoms or has a 6-membered oxygen heterocycle containing 3 oxygen atoms and is capable of undergoing such polymerization or copolymerization a catalyst having the general formula

$$Q^+ [PF_6]^-$$

wherein $Q^+$ represents a triarylcarbonium ion, and adjusting the temperature of the reaction until polymerization takes place.

2. A process as claimed in claim 1 wherein the aryl groups of the triarylcarbonium ion are phenyl groups.

3. A process as claimed in claim 1 wherein the catalyst is triphenylmethyl hexafluorophosphate.

4. A process as claimed in claim 1 wherein the polymerization is carried out at a temperature in the range 0° to 30° C.

5. A process as claimed in claim 1 wherein the monomeric material is tetrahydrofuran.

6. A process as claimed in claim 1 wherein the monomeric material is 1,3-dioxolane.

References Cited

UNITED STATES PATENTS

| | | | |
|---|---|---|---|
| 2,856,370 | 10/1958 | Muetterties | 260—2 |
| 3,395,124 | 7/1968 | May et al. | 260—67 |

FOREIGN PATENTS

| | | | |
|---|---|---|---|
| 898,269 | 7/1944 | France | 260—2 |
| 741,478 | 11/1952 | Germany | 260—2 |

OTHER REFERENCES

Meerwein et al.: "Angewandte Chemie," vol. 72, No. 24, December 1960, pp. 927–934.

Bawn et al.: "Polymer," vol. 6, February 1965, pp. 95–98.

Sharp et al.: "Journal Chem. Soc.," London, 1957, pp. 674–682.

British Industrial Plastics, Ltd., 65 Chem. Abstracts 828d (1966).

Goodrich et al.: "Jour. American Chem. Soc.," vol. 88, August 1966, pp. 3509–3511.

Fujisawa et al.: "Bull. Chem. Soc., Japan.," vol. 37, June 1964, pp. 793–796.

WILLIAM H. SHORT, Primary Examiner

L. M. PHYNES, Assistant Examiner

U.S. Cl. X.R.

260—67, 91.1, 93.5, 93.7